Aug. 15, 1950 J. R. STALLOCH ET AL 2,518,831
SANITARY STRIP CUP
Filed July 9, 1946
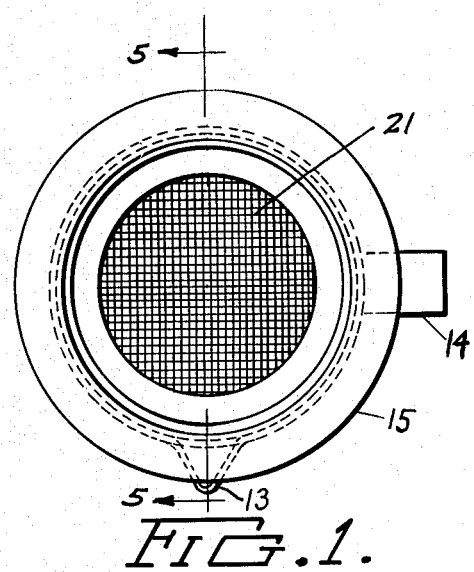
FIG. 1.
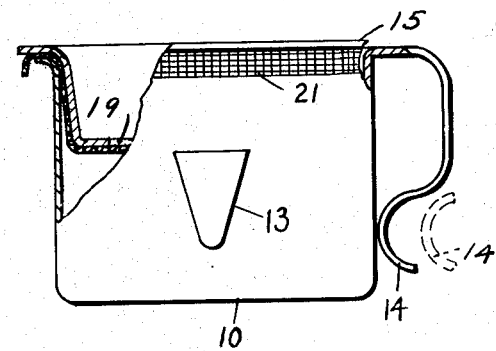
FIG. 2.
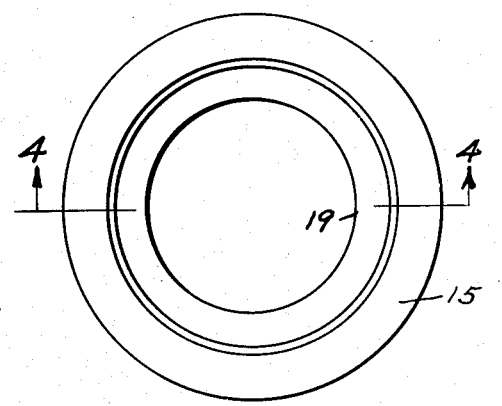
FIG. 3.
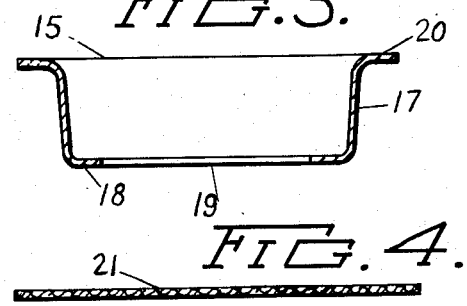
FIG. 4.
FIG. 6.
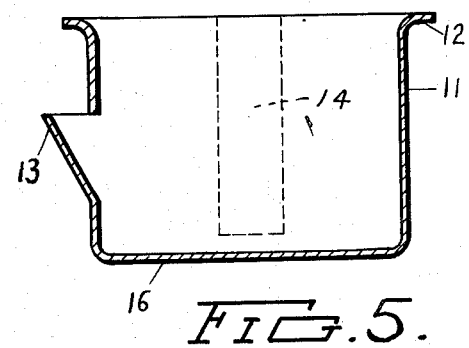
FIG. 5.
INVENTOR.
JOHN R. STALLOCH.
MARSHALL F. WILKINSON
BY Howard J. Whelan.
ATTORNEY.

Patented Aug. 15, 1950

2,518,831

UNITED STATES PATENT OFFICE 2,518,831

SANITARY STRIP CUP

John R. Stalloch, Baltimore, Md., and Marshall F. Wilkinson, Utica, N. Y.

Application July 9, 1946, Serial No. 682,246

1 Claim. (Cl. 210—159)

This invention relates to milking equipment and more particularly to a sampler for testing milk as it is being removed from the cow or other animal, for garget or mastitis.

The conventional manner of taking samples of milk from animals consists in the dipping of milk from a milk pail and then putting it through the customary microscopic processes, to determine whether the milk is suitable for consumption or not. The disadvantage of this method, is that the cow is usually completely milked and the milk mixed with other milk and carried a long distance before the test is made, and the milk in the container is all wasted if the disease is present. In addition the time spent between the milking and the dipping may be so considerable as to change the general aspect of the milk. If the animal was sampled in the field and a quick test made for determining her condition, such waste would be avoided. Previously a method of making such a test in this field manner was not available, and therefore not adopted.

It is an object of this invention to provide a new and improved method and arrangement for testing the milk of animals in the field that will avoid one or more of the disadvantages and limitations of the prior art.

Another object of the present invention is to provide a new and improved method and arrangement for making tests of the milk of animals in the field that will permit such to be easily and quickly made without requiring cumbersome facilities for doing so, and without any elaborate special training.

Another object of the present invention is to provide a new and improved method and arrangement for making tests of the milk of cows and animals that can be readily attached to the belt of the user.

Other objects will become apparent as the invention is more fully set forth.

For a clearer understanding of the invention, reference is made to the appended drawings and the following description wherein an outline of a particular form of the invention is given by way of example, while the scope and spirit of the invention is particularly pointed out in the claim.

In the drawings:

Figure 1 is a plan view of a milk sampler unit embodying this invention,

Figure 2 is a side view of Figure 1 with portions broken away to show its internal construction, Figure 3 is a plan view of the framing ring used with the unit shown in Figure 1, Figure 4 is a sectional elevation detail of the framing ring taken along line 4—4 of Figure 3, Figure 5 is a sectional elevational detail taken along line 5—5 of Figure 1, Figure 6 is a longitudinal view of the filter cloth used in this embodiment.

Similar reference characters refer to similar parts throughout the drawings.

In the particular form shown in the illustrations, 10 represents a cylindrical cup-like container with relatively high walls 11 and open at the top, the upper edge of flange portions 12 of the container being bent peripherally outwardly to a horizontal plane for a short distance. A spout 13 of tapered form with its pouring lip straight and horizontal is formed in the walls and aligned about the middle thereof as indicated. A handle 14 is formed at the side with its bottom portion bent in an arcuate form and free but close to the wall 11 to form a facile manner of attaching the container to the belt of the user. It is located on the container in a position at right angles to that of the spout 13. The bottom 16 of the container is filleted with long sweeping bends to permit ready cleaning.

A framing ring 15 is somewhat like a cup, having a diameter less than that of the container 10 so it can fit neatly therein and at the same time hold a specially treated cloth filter 21 between the walls 11 and 17 respectively and horizontally over the bottom 18 and the circular hole 19. This spaces it above the bottom of the container. This is indicated in the drawings. The cloth is impregnated with bromothymol. An upper circular peripheral flange 20 is formed on the walls 17 of the ring and extends over the flange 12 to protect the flanges of the container below and the filter cloth, when the unit is assembled.

In the use of the unit, the user, takes a sample of the milk from the cow into the framing ring and passes it through the filter cloth 21. If it contains the garget or mastitis characteristics, it will present "white" strings across the surface of the cloth and form a color contrast to same, all the remaining liquid ingredients to continue through. The condition of the milk is then made immediately apparent to the user, and if necessary or the conditions warrant, no further milk is used from the cow. The ingredients can be poured out of the container through the spout 13, and the contents visually observed. This is in addition to the filter test. The treatment of the filter cloth which is preferably of a dark color to show the color contrast noted above with bromothymol induces the stringy contents to settle quickly and gives it a green color. The filter cloth is usually dipped into a solution of bromothymol, withdrawn and allowed to dry, then placed in the cup to be used in the tests, or it may be purchased treated and ready for use.

The ring 15 is made deep enough to bring its bottom just above the level of the spout lip. The ring and container are preferably made of polished stainless steel and rounded so that the bends have long sweeping radii.

The device is simple in construction, which gives it a very desirable portability and is strong enough to enable it to withstand rough usage that it is apt to incur. The placement or removal of the cloth filter is performed expeditiously and without requiring tools of any kind. At the same time it permits the cloth to be tightly arranged in the unit. The filter cloths may be changed and discarded as required.

While but one general form of the invention is shown in the drawings and described in the specifications it is not desired to limit this application for patent to this particular form, as it is appreciated that other forms of construction could be made that would use the same principles and come within the scope of the appended claim.

Having thus described the invention, what is claimed is:

A sampler unit of the class described comprising a cylindrical receptacle having its circular upper edge bent peripherally outwardly in a horizontal plane, a framing ring adapted to fit within said receptacle, said ring being generally cylindrical and having its circular upper edge also bent peripherally outwardly but to a greater extent than the upper edge of said receptacle, the upper edge of said ring being adapted to rest upon the upper edge of said receptacle, said ring having a circular opening through its bottom, said receptacle having a pouring spout on its side wall, the bottom of the ring, when in place in said receptacle, being just above the said spout, a flexible hook-shaped handle on said receptacle at right angles to said spout and having a free end for attachment to the garment of the user and a chemically treated filter secured between the upper edges of said receptacle and ring for securement, and extending between the inner wall of said receptacle and the outer wall of same framing ring and across the opening in said ring.

JOHN R. STALLOCH.
MARSHALL F. WILKINSON.

REFERENCES CITED

The following references are of record in the file of this patent:

UNITED STATES PATENTS

| Number | Name | Date |
|---|---|---|
| 789,062 | Prescott | May 2, 1905 |
| 828,222 | Leavitt | Aug. 7, 1906 |
| 972,295 | Towns | Oct. 11, 1910 |
| 1,080,262 | Clark | Dec. 2, 1913 |
| 1,831,034 | Roeder | Nov. 10, 1931 |
| 2,106,453 | Ekdahl | Jan. 25, 1938 |
| 2,162,156 | Case | June 13, 1939 |

FOREIGN PATENTS

| Number | Country | Date |
|---|---|---|
| 185,807 | Great Britain | Sept. 21, 1922 |
| 804,445 | France | Aug. 3, 1936 |